United States Patent
Hirai

(10) Patent No.: US 9,228,673 B2
(45) Date of Patent: Jan. 5, 2016

(54) FLOW REGULATING DEVICE

(71) Applicant: Surpass Industry Co., Ltd., Gyoda-shi, Saitama (JP)

(72) Inventor: Kazuki Hirai, Saitama (JP)

(73) Assignee: SURPASS INDUSTRY CO., LTD., Gyoda-Shi (JP)

( * ) Notice: Subject to any disclaimer, the term of this patent is extended or adjusted under 35 U.S.C. 154(b) by 0 days.

(21) Appl. No.: 14/183,776

(22) Filed: Feb. 19, 2014

(65) Prior Publication Data

US 2014/0231682 A1 Aug. 21, 2014

(30) Foreign Application Priority Data

Feb. 20, 2013 (JP) ................. 2013-031316

(51) Int. Cl.
*F16K 31/122* (2006.01)
*G05D 7/03* (2006.01)
*F16K 31/126* (2006.01)

(52) U.S. Cl.
CPC .............. *F16K 31/122* (2013.01); *G05D 7/03* (2013.01); *F16K 31/1262* (2013.01)

(58) Field of Classification Search
CPC ...... F16K 31/122; F16K 31/1262; G05D 7/03
USPC ............... 251/92, 61, 61.2, 61.3, 62, 63.5, 63
See application file for complete search history.

(56) References Cited

U.S. PATENT DOCUMENTS

| 4,304,390 | A | * | 12/1981 | Kawabata et al. | ............... 251/61 |
| 4,794,940 | A | * | 1/1989 | Albert et al. | ....................... 137/1 |
| 5,906,218 | A | * | 5/1999 | Carey | .................. G05D 16/2053 137/82 |
| 5,924,448 | A | * | 7/1999 | West | ....................... F04B 43/06 137/565.13 |
| 7,487,792 | B2 | * | 2/2009 | Yoshino et al. | ................ 137/504 |
| 2003/0217957 | A1 | * | 11/2003 | Bowman, Jr. | ............ A61M 1/28 210/232 |
| 2013/0015377 | A1 | * | 1/2013 | Gamache | .............. F16K 31/126 251/12 |

FOREIGN PATENT DOCUMENTS

JP 2011089647 5/2011

* cited by examiner

*Primary Examiner* — John K Fristoe, Jr.
*Assistant Examiner* — Josephine Trinidad-Borges
(74) *Attorney, Agent, or Firm* — MH2 Technology Law Group, LLP

(57) ABSTRACT

A flow regulating device 1 is provided which includes: a valve element 19 which is movable into contact with or away from a valve seat 18; a spring 21 for exerting an urging force on the valve element 19; a diaphragm 20 fixed to an end of the valve element 19, the diaphragm having a fluid contact surface 20a and a back surface 20b; a pressure chamber 24 into which compressed air is externally introduced; and a piston 25 for transmitting the pressure of the compressed air that is introduced into the pressure chamber 24 to the back surface 20b of the diaphragm 20, wherein a portion of the piston 25 which portion receives the pressure of the compressed air has an area equal to or more than twice the area of the fluid contact surface 20a of the diaphragm 20.

2 Claims, 5 Drawing Sheets

FLOW REGULATING DEVICE

CROSS-REFERENCE TO RELATED APPLICATIONS

This application is based on Japanese Patent Application No. 2013-031316, the contents of which are incorporated herein by reference in its entirety.

TECHNICAL FIELD

The present disclosure relates to a flow regulating device for regulating the flow rate of fluid including, for example, liquid chemical and pure water.

BACKGROUND ART

There are conventionally well-known flow regulating devices used in a fluid supplying line for mixing together a plurality of different liquid chemicals, for accurately regulating the flow rate of pure water or the like used in a process of manufacturing products or the like. Such a flow regulating device is also generally referred to as "regulator". As a flow regulating device used for this type of application, there is known a device configured as disclosed in PTL 1 indicated below, for example.

In the flow regulating device disclosed in PTL 1, the air pressure of air introduced to a pressure chamber is applied to a first diaphragm. The pressure applied to the first diaphragm is transmitted to a second diaphragm through an annular curved portion provided therebetween. A valve element is fixed to the second diaphragm, and the air pressure in the pressure chamber causes a force to be exerted on the valve element in a direction to bring the valve element away from a valve seat. As the valve element is urged by an urging force from a spring in a direction to bring the valve element into contact with the valve seat, the position of the valve element with regard to the valve seat is adjusted by adjusting the air pressure in the pressure chamber.

CITATION LIST

Patent Literature (PTL 1) Japanese Unexamined Patent Application, Publication No. 2011-089647

SUMMARY

Technical Problem

In the flow regulating device disclosed in PTL 1, a portion of the second diaphragm which portion contacts with fluid in a valve chamber has an area which is generally equal to the area of a portion of the first diaphragm which portion receives the air pressure in the pressure chamber. Thus, when the fluid pressure of fluid in the valve chamber is similar to atmospheric pressure, the valve element is allowed to be separated from the valve seat by adjusting the air pressure in the pressure chamber to a pressure greater than the total force of atmospheric pressure and the urging force caused by the spring.

However, in cases where the valve chamber contains a high-pressure fluid having a remarkably higher pressure than atmospheric pressure (for example, a fluid having a pressure of 1.013 MPa that is ten times as high as atmospheric pressure), in order to separate the valve element from the valve seat, the air pressure in the pressure chamber is required to be further increased by the pressure difference value between the fluid pressure and atmospheric pressure.

Typically, air introduced into a flow regulating device has an air pressure of about 0.5 MPa. Thus, in the case where the valve chamber contains a high-pressure fluid having a remarkably higher pressure than atmospheric pressure, the flow regulating device disclosed in PTL 1 is not capable of increasing the air pressure in the pressure chamber to the extent that allows the valve elements to be separated from the valve seat.

As disclosed herein, a flow regulating device is capable of regulating a flow of high-pressure fluid without requiring an air-pressure supplying device equipped with an expensive pressure regulating mechanism.

Solution to Problem

In order to solve the above described problem, the present disclosure adopts the following solutions.

A flow regulating device according to some embodiments of the present disclosure includes: a housing part including a flow channel formed therein, and an inlet port and an outlet port provided at respective ends of the flow channel; a valve element part which is movable to get into contact with or away from a valve seat part provided in the flow channel so as to place the flow channel in a closed state or an open state; a spring part for exerting an urging force on the valve element part in a direction to bring the valve element part into contact with the valve seat part; a diaphragm fixed to an end of the valve element part, the diaphragm having a first surface which contacts with a fluid flowing in the flow channel, and a second surface which does not contact with the fluid; a pressure chamber into which an operating gas is externally introduced; and a piston part for transmitting pressure of the operating gas that is introduced into the pressure chamber to the second surface of the diaphragm, wherein a portion of the piston part which portion receives the pressure of the operating gas has an area equal to or more than twice the area of the first surface of the diaphragm.

In the flow regulating device according to some embodiments of the present disclosure, the valve element part receives a force in the direction to bring the valve element part into contact with the valve seat part where the force is caused by the urging force from the spring part and the fluid pressure of fluid transmitted via the first surface of the diaphragm. The valve element part also receives another force in the direction to bring the valve element part away from the valve seat part where the force is caused by the pressure of the operating gas in the pressure chamber and transmitted through the piston part to the diaphragm. In addition, the area of the portion of piston part which portion receives the pressure of the operating gas is equal to or more than twice that of the first surface of the diaphragm. For example, in a case where the fluid pressure of fluid is ten times as high as atmospheric pressure, when the pressure of the operating gas in the pressure chamber is set to half the fluid pressure (i.e. five times as high as atmospheric pressure), the force caused by the pressure of the operating gas in the direction to bring the valve element part away from the valve seat part becomes equal to or greater than the force caused by the fluid pressure of fluid in the direction to bring the valve element part into contact with the valve seat part.

As described above, in the flow regulating device according to some embodiments of the present disclosure, the valve element part is allowed to be separated from the valve seat by setting the pressure of the operating gas introduced into the pressure chamber to a pressure equal to or greater than the total force of half the fluid pressure of the fluid (e.g. five times as high as atmospheric pressure) and the urging force caused by the spring part.

Thereby, a flow regulating device can be provided which is capable of regulating a flow of high-pressure fluid without requiring an air-pressure supplying device equipped with an expensive pressure regulating mechanism that can produce an operating gas introduced into a pressure chamber with a higher pressure than the pressure of the high-pressure fluid.

In some embodiments of the present disclosure, the flow regulating device includes a membrane member disposed between the pressure chamber and the piston part for isolating the pressure chamber from the piston part, wherein the piston part receives the pressure of the operating gas introduced into the pressure chamber through the membrane member.

This allows the pressure of the operating gas introduced into the pressure chamber to be transmitted to the piston part through the membrane member while the membrane member isolates the pressure chamber from the piston part.

In the flow regulating device of the above aspect, the piston part may include a communication hole extending from a surface of the piston part which surface contacts with the membrane member to a surface of the piston part which surface contacts with the diaphragm.

This prevents air from being accumulated between the piston part and the membrane member, thereby ensuring that the pressure of the operating gas in the pressure chamber is transmitted to the piston part.

The flow regulating device of the above aspect may include an opening hole for providing communication between a space defined by the second surface of the diaphragm and the membrane member, and the outside of the flow regulating device.

This can prevent the pressure in the space defined by the second surface of the diaphragm and the membrane member from changing due to the movement of the piston part. Thus, the piston part is allowed to move smoothly, thereby ensuring that the pressure of the operating gas in the pressure chamber is transmitted to the piston part.

According to some embodiments of the disclosure set forth herein, there is provided a flow regulating device which is capable of regulating a flow of high-pressure fluid without requiring an air-pressure supplying device equipped with an expensive pressure regulating mechanism.

DESCRIPTION OF EMBODIMENTS

Hereinafter, a flow regulating device in accordance with some embodiments of the present disclosure is described with reference to the accompanying drawings.

As shown in FIGS. 1 to 5, a flow regulating device 1 of the present embodiment includes a housing 10 (housing part) made of a material such as resin, fluororesin material that is excellent in chemical resistance, and the like. The housing 10 includes a flow channel formed therein for fluid flow, and a fluid inlet port 11 and a fluid outlet port 17 provided at respective ends of the flow channel.

Figure 1:
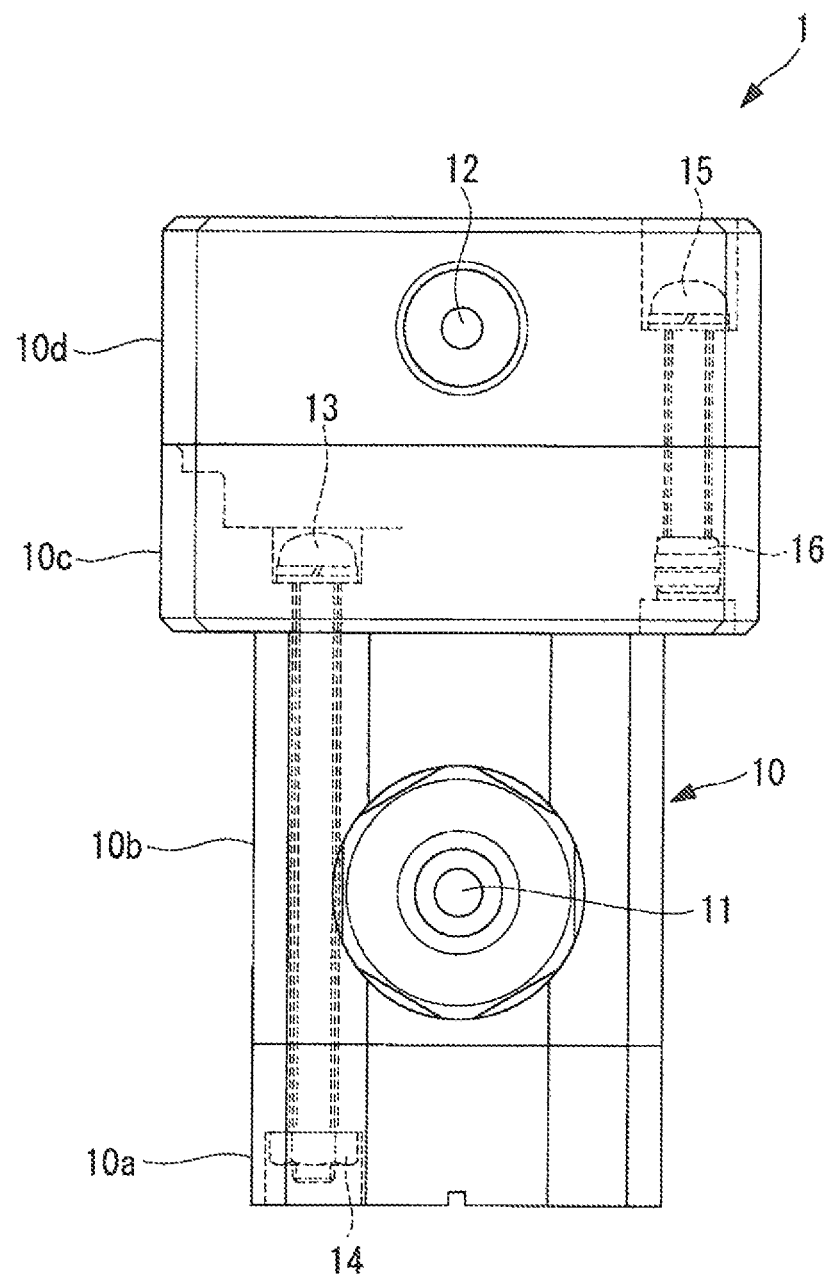
FIG. 1 is a front view of a flow regulating device in accordance with some embodiments of the present disclosure.

FIG. 1 is a front view of the flow regulating device 1 in accordance with some embodiments of the present disclosure.

As shown in FIG. 1, the housing 10 is constituted by four housing blocks 10a, 10b, 10c, and 10d. The housing blocks 10a, 10b, and 10c are fastened to one another by a fastener consisting of a fastening bolt 13 and a fastening nut 14. The housing blocks 10c and 10d are fastened to each other by a fastener consisting of a fastening bolt 15 and a female screw portion 16 formed in the housing block 10c. The housing blocks 10a, 10b, 10c, and 10d are fastened together by the fasteners in this manner.

Each of the fastening work of the housing blocks 10a, 10b, and 10c with the fastening bolts 13 and the fastening work of the housing blocks 10c and 10d with the fastening bolt 15 is independently performed. This causes the housing blocks 10c and 10d to be firmly fastened together, thereby allowing a pressure chamber 24 to be maintained in a sealed state even when the pressure in the pressure chamber 24 becomes a high pressure.

Figure 2:
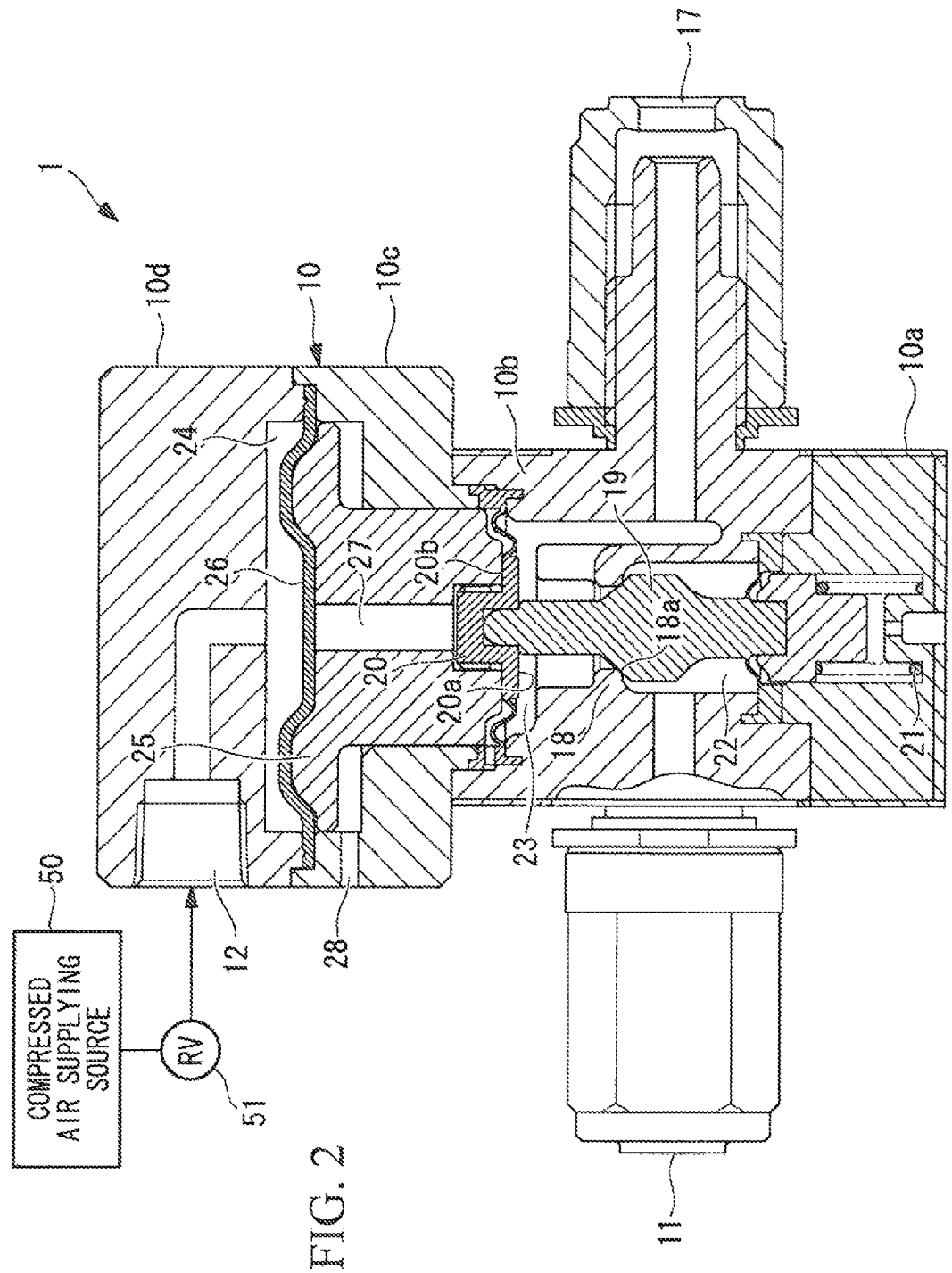
FIG. 2 is a right side cross-sectional view of the flow regulating device of some embodiments of the present disclosure showing the flow regulating device in a fully closed state.
Figure 3:
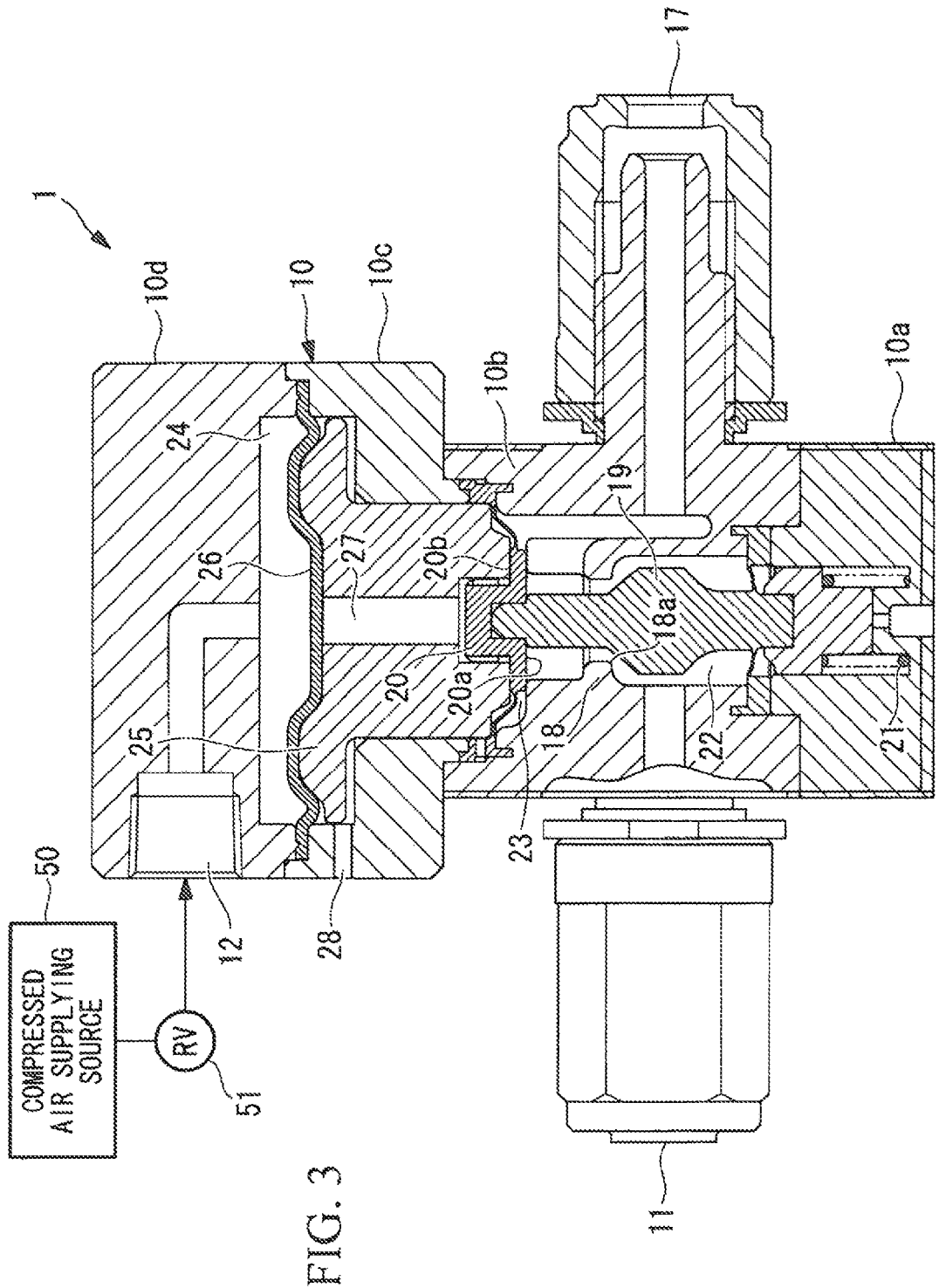
FIG. 3 is a right side cross-sectional view of the flow regulating device of some embodiments of the present disclosure showing the flow regulating device in a fully open state.

FIG. 2 is a right side cross-sectional view of the flow regulating device 1 of some embodiments of the present disclosure showing the flow regulating device 1 in a fully closed state. FIG. 3 is a right side cross-sectional view of the flow regulating device 1 of some embodiments of the present disclosure showing the flow regulating device 1 in a fully open state.

As shown in FIGS. 2 and 3, the housing 10 includes therein a valve seat 18 (valve seat part) having an opening surface 18a which is in communication with the inlet port 11, and a valve element 19 (valve element part) that is movable in the direction perpendicular to the opening surface 18a of the valve seat 18 (in a vertical direction of the figure). A diaphragm 20 is fixed at the upper end portion of the valve element 19. A spring 21 (spring part) is provided at the lower end of the valve element 19 for urging the valve element 19 in a direction to bring the valve element into contact with the valve seat 18. The valve element 19 is movable into contact with or away from the valve seat 18 so as to place a flow channel in a closed state or an open state.

The flow channel for fluid flow in the flow regulating device 1 includes a first space 22 (generally referred to as "valve chamber") connecting the inlet port 11 to the valve element 19, and a second space 23 provided between the valve seat 18 and the diaphragm 20 and communicating with the outlet port 17. Fluid entering from the inlet port 11 is introduced into the first space 22, and then passes through a space between the valve element 19 and the opening surface 18a of the valve seat 18 to flow into the second space 23, and then flows out from the outlet port 17. The flow regulating device 1 regulates the flow rate of the fluid by adjusting the gap between the valve element 19 and the opening surface 18a of the valve seat 18.

The diaphragm 20 is fixed at the upper end portion of the valve element 19, and has a fluid contact surface 20a (first surface) which contacts with the fluid flowing in the second space 23, and a back surface 20b (second surface) which does not contact with the fluid. A piston 25 (piston part) is disposed above the diaphragm 20 in such a manner that the piston is in contact with the back surface 20b of the diaphragm 20. A separating membrane 26 is disposed between the pressure chamber 24 and the piston 25 to isolate the pressure chamber 24 from a space in which the piston 25 exists.

The separating membrane 26 is a membrane member that is of a circular shape in plan view, and has high heat resistance and elasticity. The separating membrane 26 is preferably made of fluororubber, for example. The separating membrane 26 is supported by the housing blocks 10c and 10d with the peripheral portion of the separating membrane clamped therebetween.

The pressure chamber 24 is a space into which compressed air is externally introduced as an operating gas, and is in communication with a pressure introduction port 12 which is formed on the housing 10. The pressure introduction port 12 is supplied with air having an adjusted desired pressure from a compressed air supply source 50 formed outside through a regulator 51. Although air is used as the operating gas introduced into the pressure chamber 24 in the present embodiment, any other type of gas such as nitrogen gas ($N_2$) may be used as the operating gas.

The air pressure supplied from the pressure introduction port 12 to the pressure chamber 24 is transmitted to the piston 25 through the separating membrane 26. Thus, the piston 25 receives via the separating membrane 26 the pressure of the compressed air introduced into the pressure chamber 24. Upon receiving the air pressure, the piston 25 transmits a pressing force to the back surface 20b of the diaphragm 20 where the pressing force presses the diaphragm 20 downward in FIG. 2.

The piston 25 has a lower surface with a recess at the center thereof. The back surface 20b of the diaphragm 20 has a projection at the center thereof. The projection of the back surface 20b of the diaphragm 20 is fitted onto the recess of the lower surface of the piston 25. Accordingly, the lower surface of the piston 25 and the back surface 20b of the diaphragm 20 are disposed in contact with each other.

When a force is transmitted to the back surface 20b of the diaphragm 20, the force is transmitted to the valve element 19 with its upper end portion that is fixed to the diaphragm 20, such that the force is transmitted to the valve element 19 in a direction to bring the valve element away from the valve seat 18. Thus, the piston 25 transmits the air pressure of air introduced into the pressure chamber 24 to the back surface 20b of the diaphragm 20 as a force in the direction to bring the valve element 19 away from the valve seat 18.

As shown in FIG. 2, the separating membrane 26 has an upwardly-protruding part which conforms to the shape of the upper surface of the piston 25. The shape of the separating membrane 26 that is in conformity to that of the upper surface of the piston 25 ensures that the air pressure applied to the separating membrane 26 is transmitted to the piston 25. As the separating membrane 26 has the protruding part, the movement of the piston 25 in the vertical direction causes the peripheral portion of the separating membrane 26 to be separated from the upper surface of the piston 25, without allowing the remaining part of the separating membrane 26 to be separated from the upper surface of the piston 25. This enables the part of the separating membrane 26 other than the peripheral portion to be kept in contact with the piston 25 even when the piston 25 moves in the vertical direction.

When air is accumulated between the piston 25 and the separating membrane 26, the accumulated air deteriorates the transmissibility of the air pressure from the separating membrane 26 to the piston 25, and the response of the transmission. Thus, in the present embodiment, the piston 25 defines a communication hole 27 therein extending from its surface which contacts with the separating membrane 26 to another surface which contacts with the diaphragm 20 in order to vent the air between the piston 25 and the separating membrane 26 out.

The communication hole 27 allows air between the piston 25 and the separating membrane 26 to be vent thereto, thereby decreasing the amount of air accumulated between the piston 25 and the separating membrane 26.

Moreover, the housing block 10c defines an opening hole 28 for providing communication between a space defined by the back surface 20b of the diaphragm 20 and the separating membrane 26, and the outside thereof. As the communication hole 27 communicates with the outside through the opening hole 28, the pressure in the space in which the piston 25 is disposed can be maintained at a constant pressure (atmospheric pressure).

The upper surface of the piston 25 has an upwardly-protruding part so as to conform to the lower surface of the separating membrane 26. The lower surface of the piston 25 has a shape in conformity to the back surface 20b of the diaphragm 20. Both the upper and lower surfaces of the piston 25 are of a circular shape in plan view. The diameter of the upper surface of the piston 25 is larger than that of the lower surface of the piston 25. Thus, the piston 25 has a stepped shape with the upper portion having a larger outer diameter than the lower portion.

With the piston 25 disposed between the separating membrane 26 and the diaphragm 20, the air pressure of air introduced into the pressure chamber 24 is transmitted indirectly to the diaphragm 20. This prevents the air pressure from being directly transmitted between the separating membrane 26 and the diaphragm 20.

Moreover, as the upper surface of the piston 25 has a shape in conformity to the lower surface of the separating membrane 26, the separating membrane 26 is prevented from excessive deformation caused by the pressure of air introduced into the pressure chamber 24. Similarly, as the lower surface of the piston 25 has a shape in conformity to the back surface of the diaphragm 20, the diaphragm 20 is prevented from excessive deformation caused by the pressure of fluid.

Thus, the piston 25 serves both the function of providing indirect transmission of the air pressure in the pressure chamber 24 to the diaphragm 20, and the function of preventing the separating membrane 26 and the diaphragm 20 from excessive deformation.

In a state shown in FIG. 2, a force exerted on the valve element 19 caused by the pressure of the compressed air in the pressure chamber (a force in the direction to bring the valve element 19 away from the valve seat 18) is smaller than the total force of the urging force caused by the spring 21 and a force caused by the pressure of fluid exerted on the valve element 19 (a force in the direction to bring the valve element 19 into contact with the valve seat 18). Accordingly, the state shown in FIG. 2 is a fully closed state in which the valve element 19 comes into contact with the valve seat 18.

In a state shown in FIG. 3, a force exerted on the valve element 19 caused by the pressure of the compressed air in the pressure chamber (a force in the direction to bring the valve element 19 away from the valve seat 18) is larger than the total force of the urging force caused by the spring 21 and a force caused by the pressure of fluid exerted on the valve element 19 (a force in the direction to bring the valve element 19 into contact with the valve seat 18). Accordingly, the state shown in FIG. 3 is a fully open state in which the valve element 19 is separated from the valve seat 18.

Figure 4:
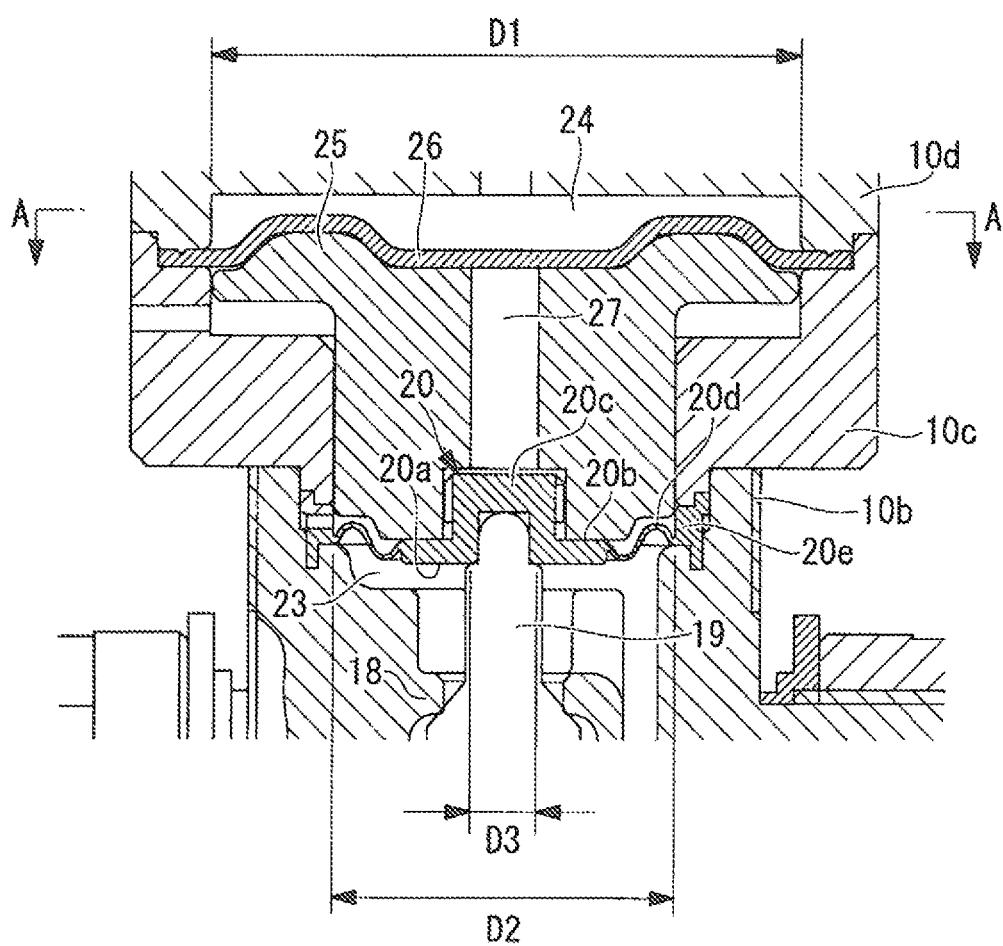
FIG. 4 is an enlarged view of a main part of the flow regulating device shown in FIG. 2.
Figure 5:
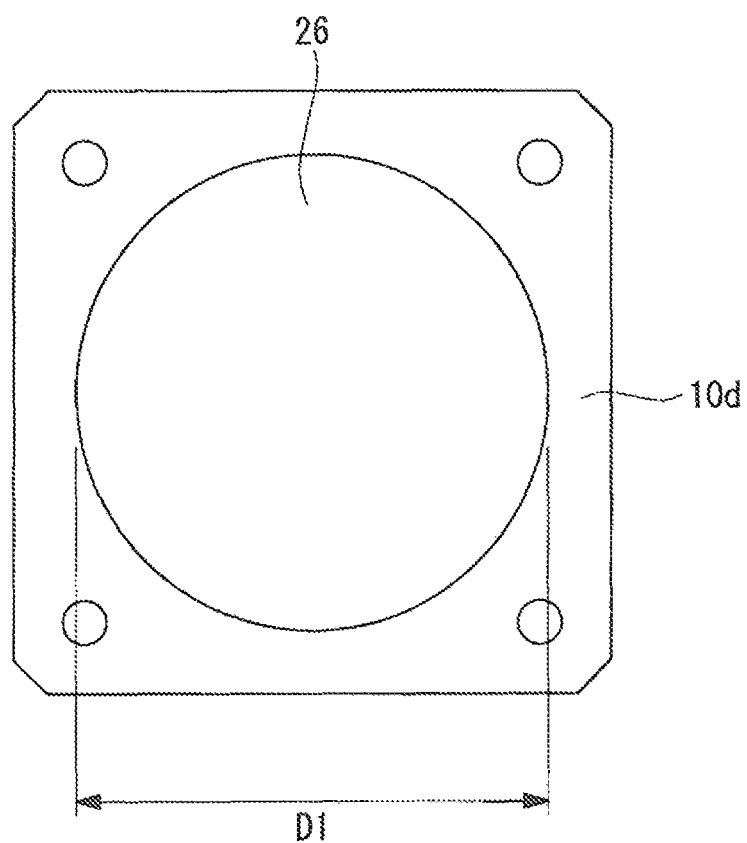
FIG. 5 is a cross-sectional view of the flow regulating device taken along line A-A in FIG. 4.

Next, the relationship between the area of the portion of the separating membrane 26 which portion receives the air pressure and that of the fluid contact surface 20a of the diaphragm 20 is described with reference to FIGS. 4 and 5. FIG. 4 is an enlarged view of a main part of the flow regulating device shown in FIG. 2. FIG. 5 is a cross-sectional view of the flow regulating device taken along line A-A in FIG. 4.

As shown in FIGS. 4 and 5, the separating membrane 26 is a membrane member with a portion facing the pressure chamber 24 that is of a circular shape in plan view. Thus, the portion of the separating membrane 26 for receiving the air pressure has an area S1 as expressed in the following formula:

$$S1 = \pi(D1/2)^2 \quad (1)$$

where D1 is a diameter of the portion of the separating membrane 26 which faces the pressure chamber 24.

As shown in FIG. 4, the area S1 of the portion of the separating membrane 26 which faces the pressure chamber 24 is equal to that of the surface of the piston 25 which surface contacts with the separating membrane 26 as viewed in plan view. Thus, the area S1 is equal to that of the portion of the piston 25 which indirectly receives the air pressure through the separating membrane 26.

Moreover, as shown in FIGS. 4 and 5, the diaphragm 20 is a membrane member with a portion facing the pressure chamber 24 that is of a circular shape in plan view. The diaphragm 20 has a center portion 20c that is a disc-shaped thick-walled member to be fixed to the upper end portion of the valve element 19. Around the center portion 20c, the diaphragm has an annular thin-walled portion 20d which enables the smooth movement of the valve element 19 in the vertical direction. The thin-walled portion 20d is preferably made of PTFE, for example, that is excellent in chemical resistance.

The outer peripheral edge of the thin-walled portion 20d is connected to an annular edge portion 20e, which is fixed by the housing blocks 10b and 10c. Thus, the fluid contact surface 20a of the diaphragm 20 has an area S2 as expressed in the following formula:

$$S2 = \pi(D2/2)^2 - \pi(D3/2)^2 \quad (2)$$

where D2 is a diameter of the outer peripheral edge of the thin-walled portion 20d, and D3 is a shaft diameter of a part of the upper end portion of the valve element 19 which part contacts with the fluid contact surface 20a.

The area S2 is an area of the fluid contact surface 20a as viewed in plan view from the direction along the center of axis of the valve element 19. Thus, the area S2 is constant regardless of the curved state of the thin-walled portion 20d.

In the present embodiment, the area S1 of the portion of the separating membrane 26 which faces the pressure chamber 24 and the area S2 of the fluid contact surface 20a of the diaphragm 20 have a relation expressed in the following formula:

$$S2 \times 2.0 \leq S1 \quad (3)$$

As indicated by the formula (3), the flow regulating device 1 of the present embodiment is configured such that the area S1 of the portion of the separating membrane 26 which faces the pressure chamber 24 is equal to or more than twice the area S2 of the fluid contact surface 20a of the diaphragm 20.

It follows that, for example, in the case where the second space 23 is supplied with a high-pressure fluid having a fluid pressure of more than ten times as high as atmospheric pressure (more than 1.013 MPa), when the air pressure of the compressed air introduced in the pressure chamber 24 is set to five times as high as atmospheric pressure (506.5 kPa), the force caused by the air pressure in the direction to bring the valve element 19 away from the valve seat 18 becomes equal to or greater than the force caused by the fluid pressure of fluid in the direction to bring the valve element 19 into contact with the valve seat 18.

Thus, the flow regulating device 1 of the present embodiment is capable of properly regulating a flow of fluid without using an air-pressure supplying device equipped with an expensive pressure regulating mechanism which can produce the compressed air introduced into the pressure chamber 24 with a higher pressure than the pressure of the high-pressure fluid.

As described above, in the flow regulating device 1 of the present embodiment, the valve element 19 receives a force in the direction to bring the valve element 19 into contact with the valve seat 18 where the force is caused by the urging force from the spring 21 and the fluid pressure of fluid transmitted via the fluid contact surface 20a of the diaphragm 20. The valve element 19 also receives another force in the direction to bring the valve element 19 away from the valve seat 18 where the force is caused by the pressure of the compressed air in the pressure chamber 24 and transmitted thereto through the piston 25.

In addition, the area S1 of the portion of piston 25 which receives the pressure of the compressed air is equal to or more than twice the area S2 of the fluid contact surface 20a of the diaphragm 20. For example, in a case where the fluid pressure of fluid is ten times as high as atmospheric pressure, when the pressure of the compressed air in the pressure chamber 24 is set to half the fluid pressure (i.e. five times as high as atmospheric pressure), the force caused by the pressure of the compressed air in the direction to bring the valve element 19 away from the valve seat 18 becomes equal to or greater than the force caused by the fluid pressure of fluid in the direction to bring the valve element 19 into contact with the valve seat 18.

Accordingly, in the flow regulating device 1 of the present embodiment, the valve element 19 is allowed to be separated from the valve seat 18 by setting the pressure of the compressed air introduced into the pressure chamber 24 to equal to or greater than the total force of half the fluid pressure of the fluid (e.g. five times as high as atmospheric pressure) and the urging force caused by the spring 21.

Thus, the flow regulating device 1 can be provided which is capable of regulating a flow of a high-pressure fluid without requiring an air-pressure supplying device equipped with an expensive pressure regulating mechanism which can produce the compressed air introduced into a pressure chamber 24 with a higher pressure than the pressure of the high-pressure fluid.

Moreover, the flow regulating device 1 of the present embodiment includes the separating membrane 26 disposed between the pressure chamber 24 and the piston 25 for isolating the pressure chamber 24 from the piston 25. The piston 25 receives the pressure of the compressed air introduced into the pressure chamber 24 through the separating membrane 26.

Thereby, the pressure of the compressed air introduced into the pressure chamber 24 is allowed to be transmitted to the piston 25 through the separating membrane 26 while the separating membrane 26 isolates the pressure chamber 24 from the piston 25.

Furthermore, in the flow regulating device 1 of the present embodiment, the piston 25 may define a communication hole 27 therein extending from a surface of the piston which surface contacts with the separating membrane 26 to another surface which contacts with the diaphragm 20.

This prevents air from being accumulated between the piston 25 and the separating membrane 26, thereby ensuring that the pressure of the compressed air in the pressure chamber 24 is transmitted to the piston 25.

In addition, the flow regulating device 1 of the present embodiment includes an opening hole 28 for providing communication between a space defined by the back surface 20*b* of the diaphragm 20 and the separating membrane 26, and the outside thereof.

This prevents the pressure in the space defined by the back surface 20*b* of the diaphragm 20 and the separating membrane 26 from changing due to the movement of the piston 25. Thus, the piston 25 is allowed to move smoothly, thereby ensuring that the pressure of the operating gas (compressed air) in the pressure chamber 24 is transmitted to the piston 25.

The present invention is not limited to the above described embodiments, and changes and modifications may be optionally made without departing from the scope of the present invention.

The invention claimed is:

1. A flow regulating device comprising:
   a housing part including a flow channel formed in the housing part, and an inlet port and an outlet port provided at respective ends of the flow channel;
   a valve element part which is movable to get into contact with or away from a valve seat part provided in the flow channel so as to place the flow channel in a closed state or an open state;
   a spring part for exerting an urging force on the valve element part in a direction to bring the valve element part into contact with the valve seat part;
   a diaphragm fixed to an end of the valve element part, the diaphragm having a first surface which contacts with a fluid flowing in the flow channel, and a second surface which does not contact with the fluid;
   a pressure chamber into which an operating gas is externally introduced;
   a piston part for transmitting pressure of the operating gas that is introduced into the pressure chamber to the second surface of the diaphragm; and
   a membrane member disposed between the pressure chamber and a first surface of the piston part for isolating the pressure chamber from the piston part and for covering the entirety of the first surface of the piston part, the first surface of the piston part receiving the pressure of the operating gas introduced into the pressure chamber through the membrane member,
   wherein the piston part includes a communication hole extending from the first surface of the piston part which surface contacts with the membrane member to a second surface of the piston part which surface contacts with the diaphragm, the communication hole being isolated from the pressure chamber by the membrane member, and
   wherein a portion of the piston part which portion receives the pressure of the operating gas has an area equal to or more than twice an area of the first surface of the diaphragm.

2. The flow regulating device according to claim 1, further comprising an opening hole for providing communication between a space defined by the second surface of the diaphragm and the membrane member, and an outside of the flow regulating device.

\* \* \* \* \*